United States Patent [19]

Anderson

[11] Patent Number: 5,917,690

[45] Date of Patent: Jun. 29, 1999

[54] REGULATED CURRENT POWER SUPPLY WITH ISOLATED SECONDARY AND OUTPUT CURRENT LIMITING

[75] Inventor: Wayne G. Anderson, Dacula, Ga.

[73] Assignee: Scientific-Atlanta, Inc., Norcross, Ga.

[21] Appl. No.: 08/866,055

[22] Filed: May 30, 1997

Related U.S. Application Data

[60] Provisional application No. 60/019,137, Jun. 3, 1996.

[51] Int. Cl.[6] ...................................................... H02H 3/18
[52] U.S. Cl. ............................................... 361/87; 361/93
[58] Field of Search ................................. 361/18, 54, 57, 361/58, 87, 93, 100, 101; 323/276, 277, 280, 282, 284

[56] References Cited

U.S. PATENT DOCUMENTS

| | | | |
|---|---|---|---|
| 4,009,419 | 2/1977 | Ligman | 361/18 |
| 4,203,141 | 5/1980 | Bishop et al. | 361/18 |
| 4,210,947 | 7/1980 | Koizumi | 361/18 |
| 4,217,616 | 8/1980 | Jessup | 361/31 |
| 4,298,896 | 11/1981 | Heitmann | 360/11 |
| 4,309,650 | 1/1982 | Boros et al. | 323/283 |
| 4,519,004 | 5/1985 | Wilkinson et al. | 358/342 |
| 4,697,230 | 9/1987 | Neft | 361/88 |
| 4,709,160 | 11/1987 | Kinoshita | 361/93 |
| 4,736,264 | 4/1988 | Segger | 361/18 |
| 4,761,702 | 8/1988 | Pinard | 361/18 |
| 4,823,070 | 4/1989 | Nelson | 323/295 |
| 4,866,588 | 9/1989 | Rene | 363/21 |
| 4,924,170 | 5/1990 | Henze | 323/272 |
| 5,028,861 | 7/1991 | Pace et al. | 323/222 |
| 5,055,991 | 10/1991 | Carroll et al. | 363/56 |
| 5,079,498 | 1/1992 | Cleasby et al. | 323/283 |
| 5,192,906 | 3/1993 | Nathan | 323/284 |
| 5,289,101 | 2/1994 | Furuta et al. | 363/21 |
| 5,438,499 | 8/1995 | Bonte et al. | 363/21 |
| 5,457,591 | 10/1995 | Mock et al. | 361/18 |
| 5,479,090 | 12/1995 | Schultz | 323/284 |
| 5,490,055 | 2/1996 | Boylan et al. | 363/41 |
| 5,502,370 | 3/1996 | Hall et al. | 323/284 |

*Primary Examiner*—Ronald W. Leja
*Attorney, Agent, or Firm*—Kenneth M. Massaroni; Kelly A. Gardner; Hubert J. Barnhardt III

[57] ABSTRACT

A regulated power supply for application in a cable signal distribution amplifier comprises a filter, voltage doubler and current sense transformer controlled by a control technique known in the art. In the event of a high impedance short condition causing severe overcurrents, the known control technique is ineffective. To alleviate the problem, a high impedance current fault control circuit includes a sampling circuit, a level adjusting circuit, a differential amplifier for providing a monitor output control voltage and a buffer circuit to the controller. In the event of a high impedance current fault, the control circuit kicks in and interrupts controller operation saving power supply components from damage caused by the overcurrent condition.

6 Claims, 4 Drawing Sheets

REGULATED CURRENT POWER SUPPLY WITH ISOLATED SECONDARY AND OUTPUT CURRENT LIMITING

This application claims benefit of U.S. Provisional Application No. 60/019,137, filed Jun. 3, 1996.

BACKGROUND OF THE INVENTION a. Technical Field

This invention relates to the field of regulated current power supplies and, in particular, to a current limiting feature therefor. The output current is sensed and regulated and, in addition, in the event of a high impedance short condition, a sampling circuit senses the condition and regulates the output current accordingly to correct for the condition.

b. Description of the Related Art

A number of techniques are known for limiting output current in a regulated power supply. Some of these include 1) setting a power limit via a controller integrated circuit and 2) depending on a voltage collapse on an auxiliary winding at short circuit on the output. Neither of these techniques involves a direct monitoring of the output current but instead result in a power setting that translates to a current setting through well known power to current relationships in the power supply.

Early generations of power supplies for cable distribution amplifiers involved fusing to protect for an overcurrent condition. There were typically provided current fuses on the output or at the input or both with or without control circuitry to trip the fuse. Such fuses were not normally resettable and so, when they activated, maintenance personnel would be required to visit the amplifier site for replacement of the current fuses in the field. Of course, field replacement of fuses is expensive and tedious. The result was that cable television service providers would require manufacturers to provide higher and higher value fuse protection that would only protect the power supply and related equipment from dead shorts. Alternatively, they would violate recommended current ratings and intentionally install an inappropriately high current value fuse. Of course, damage to the circuitry could be the result. Consequently, these fuses would not protect the equipment from high impedance shorts and would not fire under those conditions. High value fuses protect against dead shorts but not against these high impedance current faults. Thus, the present problem solved by the present invention arose over time. Also, monitoring power at the output rather than current can allow a potentially damaging current to flow on the occurrence of a high impedance short circuit condition before the preset power limit cuts in and a controller can interrupt the current flow.

Segger, U.S. Pat. No. 4,736,264, discloses a primary switched-mode power supply including an opto-isolator coupled to the secondary side of a transformer. Segger's simple over-current protection does not correct the problem solved by the present invention.

Consequently, there remains a need in the art to provide a solution to the potentially damaging high impedance over-current problem of prior art power supplies, especially those used in cable distribution systems.

SUMMARY OF THE INVENTION

A typical switched power supply comprises a filter for filtering an AC voltage input, a voltage doubler for boosting the input voltage for more efficient regulation by the power supply and a current sense transformer having a secondary for current sensing purposes. The sensed current is provided to a well known controller for providing a precise value of current output. In addition, a FET and FET driver are connected to the output of the controller to provide an output voltage regulated by the controller. The improvement of the present invention relates to protecting against a high impedance short condition that can occur in the output of the power supply with implications for damaging other subsystems of the amplifier separate from the power supply. Such high impedance current faults have been known to occur from time to time on the output of the power supply.

The improvement offered by the present invention is the precise control of such high impedance current faults. Without the high impedance current limit circuit of the present invention, the power supply typically relies on the current sensing circuit and controller operation to limit the delivered power to a load (in a typical case, a cable signal distribution amplifier).

Under high impedance fault conditions, there exists a condition of operation of the power supply where it becomes power limited but not current limited. At the occurrence of this high impedance fault, the output voltage drops and the current rises to maintain constant power. The rising current is potentially hazardous to the power supply and subsystems of the amplifier it powers if not detected and properly restricted.

An improved power supply comprises a high impedance fault control circuit including a sampling circuit such as a sampling resistor connected in series with the output current, a level adjuster and a differential amplifier as a comparator used to convert a differential current sense voltage from the sampling resistor to a single ended control voltage for input into a buffer for interrupting the controller operation in the event of detection of the high impedance short circuit condition. Without the present invention, the controller normally interrupts after time but the high impedance short protection circuit of the present invention operates more quickly in the event of a damaging overcurrent condition.

DETAILED DESCRIPTION OF THE INVENTION

Figure 1A:
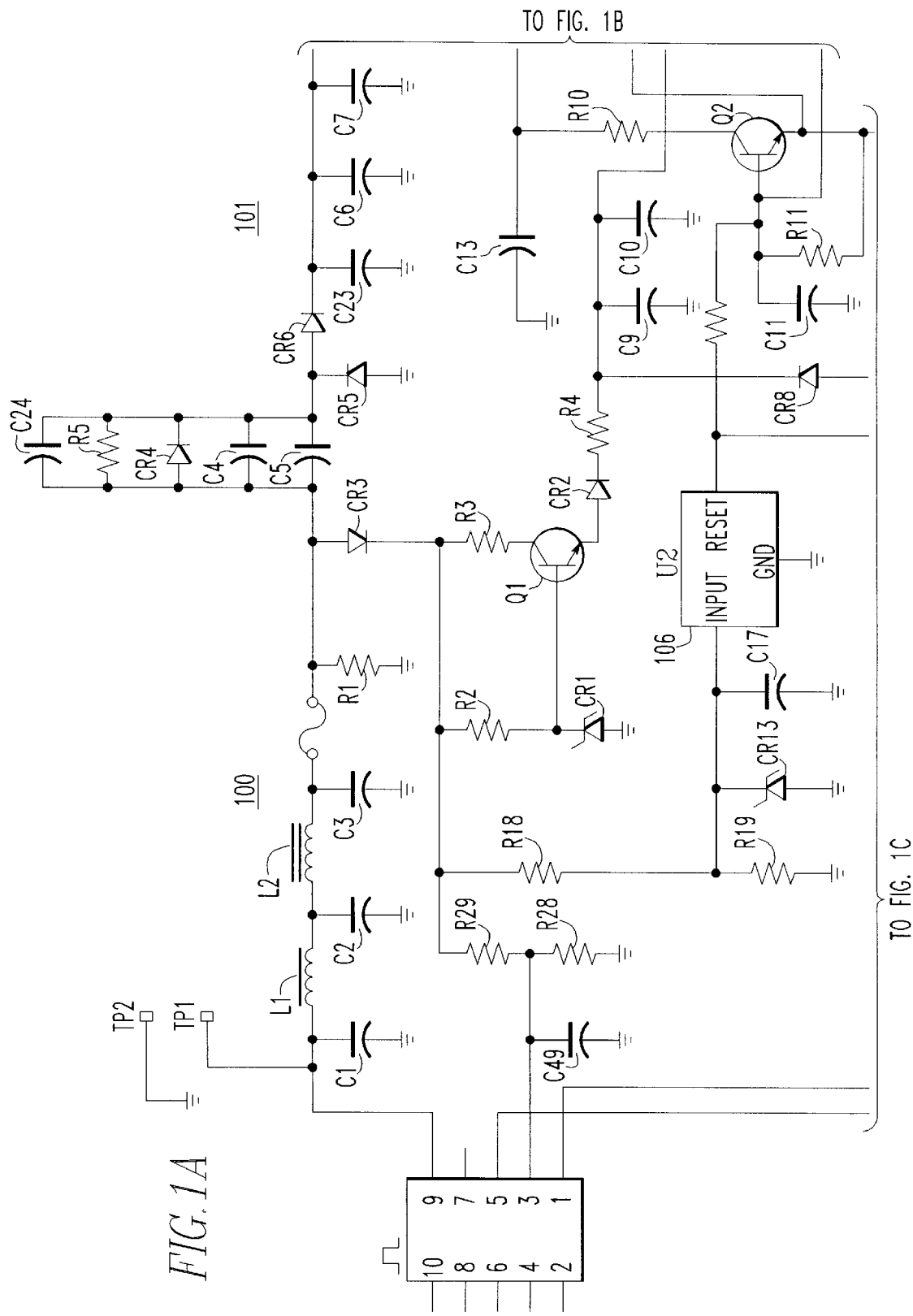
FIGS. 1A–1D are a schematic diagram of the regulated, switched power supply of the present invention including a high impedance short correction circuit 120, 125, 130 which solves the problems not addressed by prior art power supplies.
Figure 1B:
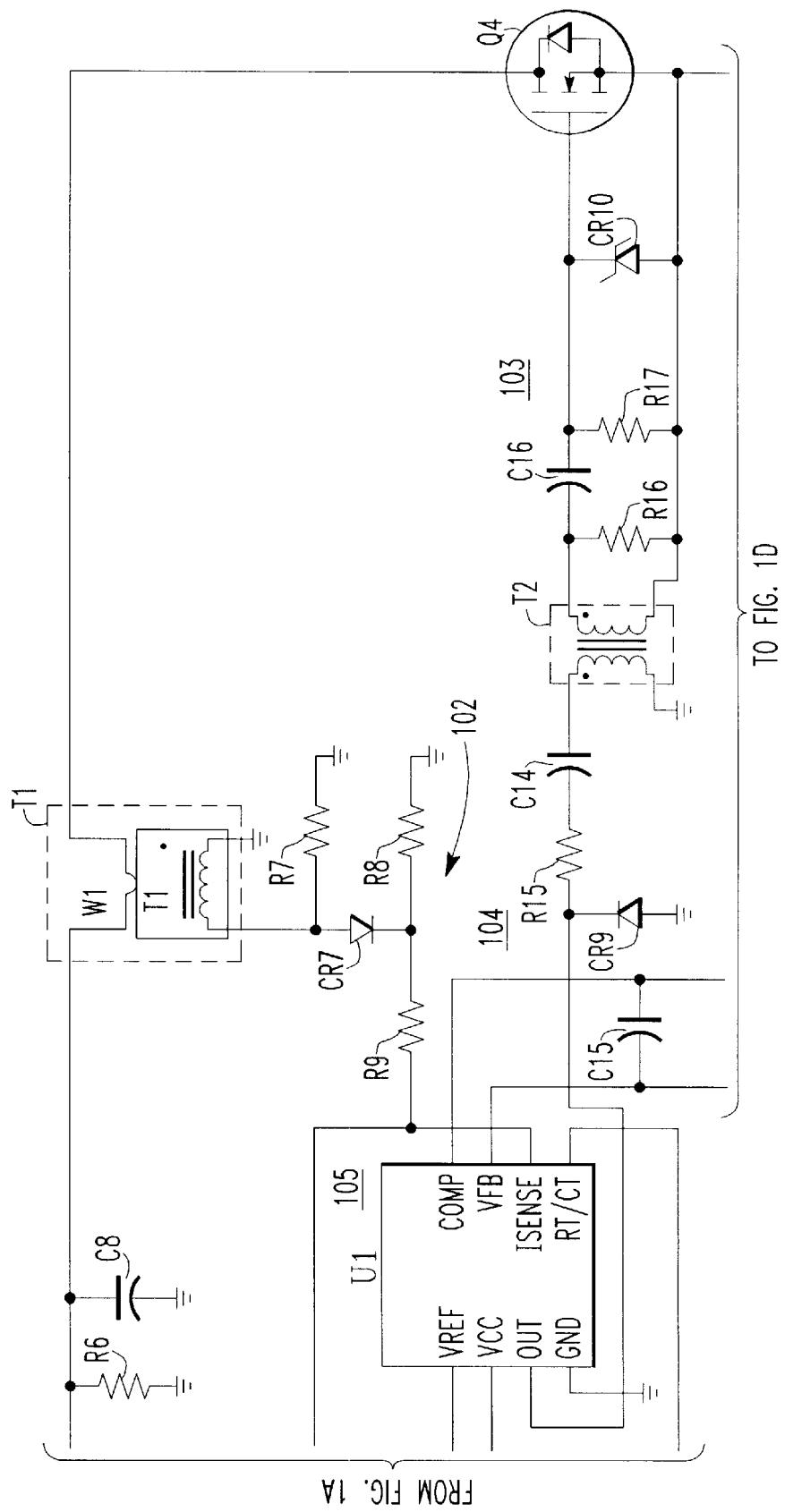
Figure 1C:
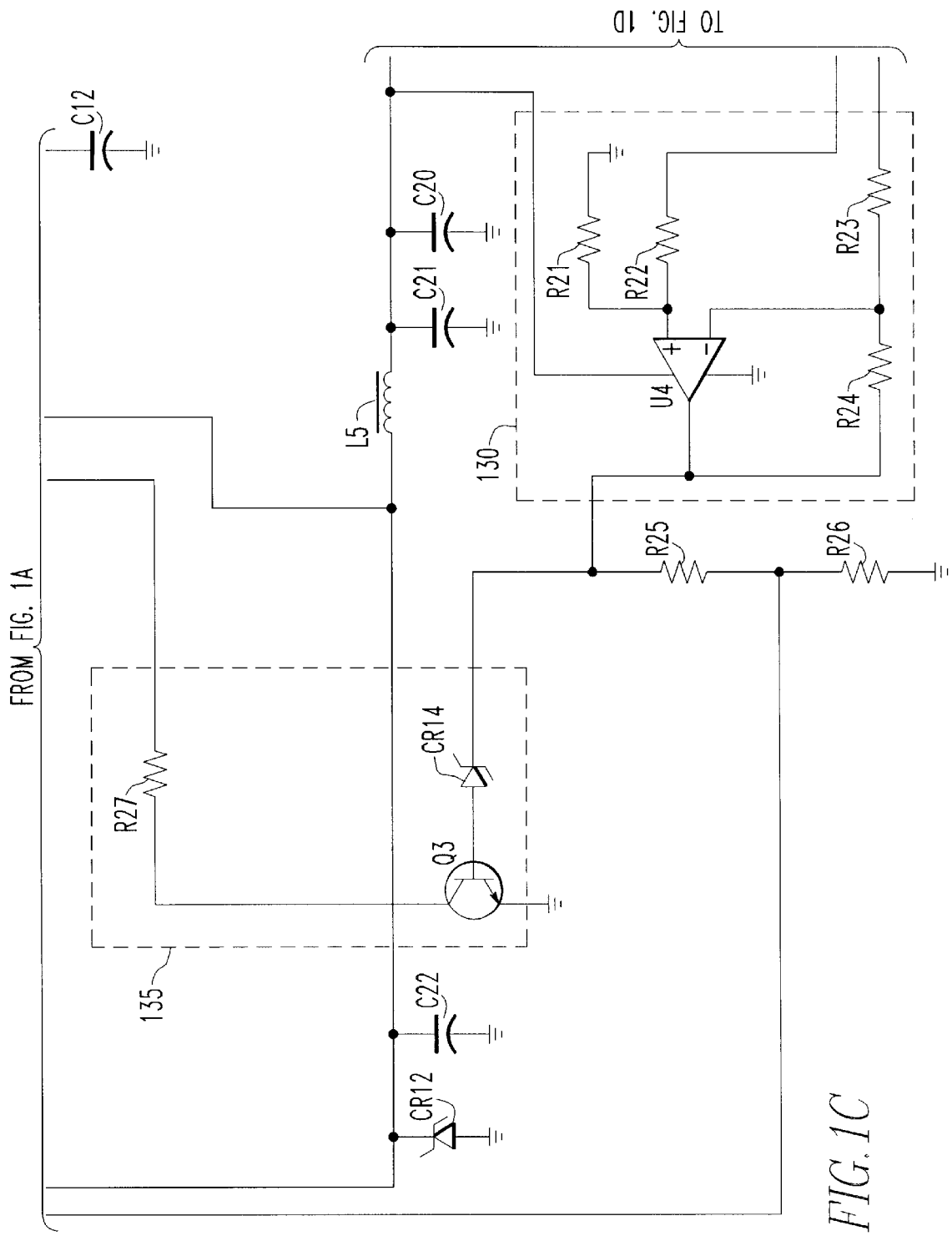
Figure 1D:
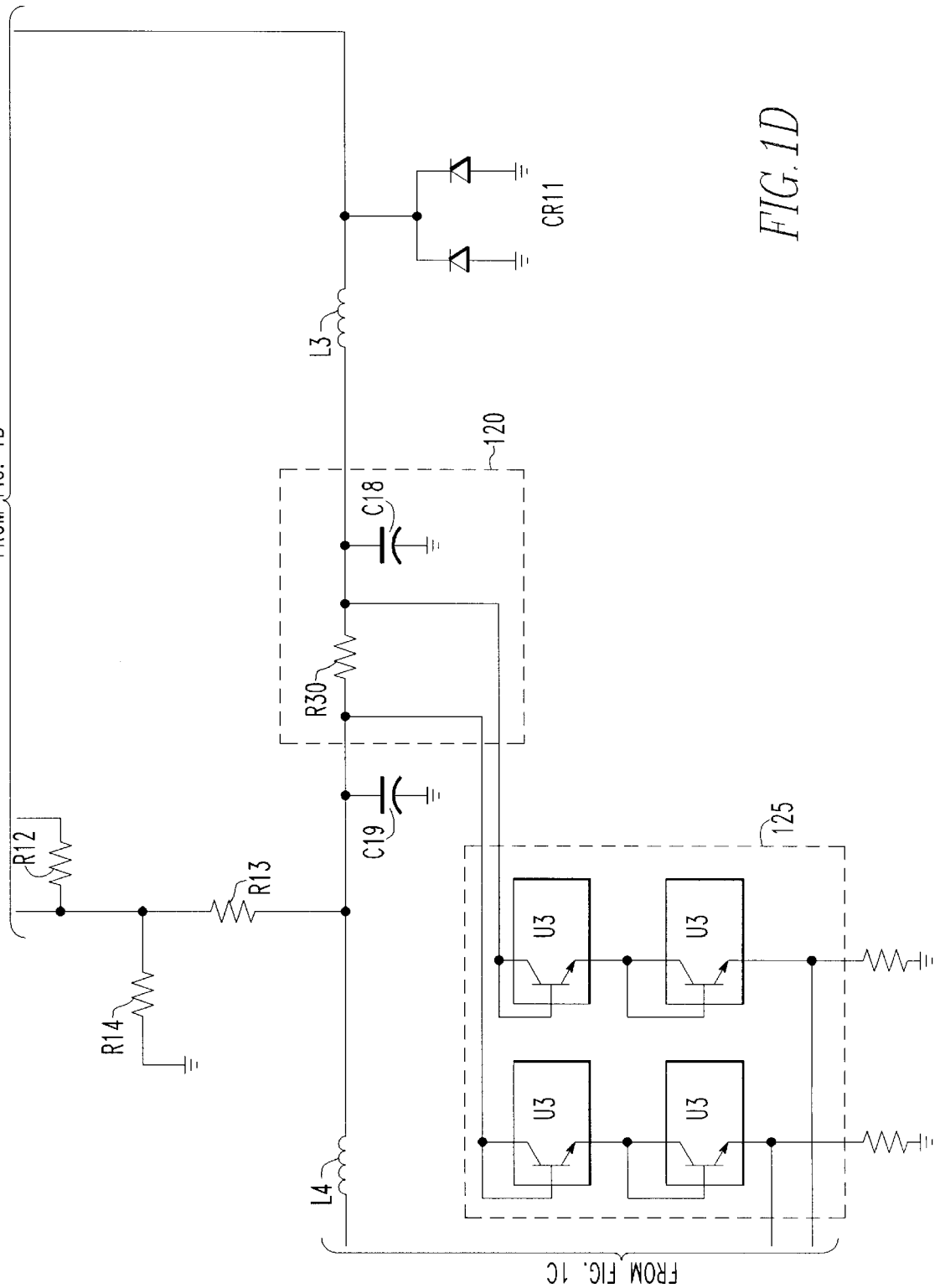

Referring to FIGS. 1A–1D, there is shown a typical switched mode power supply incorporating a high impedance short circuit control circuit 120, 125, 130 according to the present invention. In particular, the power supply comprises an input filter 100 to reject internal noise, a voltage doubler 101 to boost the filtered input voltage for more efficient regulation by the power supply, a current sense transformer T1, whose configuration provides switched current information to a controller integrated circuit 105, a FET driver 103 and FET that function as an isolated solid state switch, an output shunt diode, series inductor, shunt capacitor for filtering, a sampling network 120, for example, of resistors to provide voltage feedback to the controller 105 for output voltage regulation, an output filter for noise elimination, a preregulator to supply start-up voltage and current to the controller 105 and an under voltage lockout circuit 106 to monitor the input AC voltage for potentially damaging low cable television distribution plant voltages. This topology shown is referred to by those in the art as a buck converter; however, the improvement, a high impedance short circuit control circuit 120, 125, 130 to be described herein, can be applied equally well to other well known topologies, especially those that are not isolated and operate off-line such as boost and buck-boost (flyback) converters.

The present invention may find application, for example, in cable signal distribution amplifiers for providing a regulated output for various components of the distribution amplifier requiring regulated power. Such power supplies must be operable outdoors under extreme conditions. Internal temperatures of amplifier housings can reach 95 degrees Centigrade. Consequently, such power supplies and the amplifiers they power must be dependable and reliable under extreme conditions. The amplifier must also be reliable under such conditions as a high impedance short condition that would not be as great a problem in indoor, localized applications but are exaggerated and a great factor when maintenance personnel are remotely located from the amplifier site and the amplifier must operate under such extreme conditions.

A filter 100, such as a low pass filter, receives an AC power (for example, utility company provided via a ferroresonant transformer or provided by the cable service provider) input that is not regulated, filters the input from internal switching noise and provides the filtered AC input to a voltage doubler 101. A well known controller 105, such as a UC2842 integrated circuit, is used as a current mode controller for power supply regulation in a well known manner. A transformer T1 is used to sense the switched current. The sensed current at the secondary of transformer T1 is provided to the controller integrated circuit 105 at input ISENSE. The primary of the current sense transformer T1 is fed to field effect transistor FET. The FET is driven by a FET driver including pulse shaping filter circuit 104 (for example, a tank filter circuit), transformer T2 and second pulse shaping circuit 103 (a second tank filter circuit). Controller 105 outputs a signal at OUT for driving the FET driver. Voltage VCC is fed to the controller 105 from the input via a preregulator consisting of regulating diode CR1, R1, R2, diode CR2 and transistor Q1. This circuit is disengaged by diode CR8 once full output voltage is reached. Finally, undervoltage lock 106, for example, an MC33064 integrated circuit, reads the input AC voltage from the utility company or cable television service provider at INPUT and shuts down controller 105 if a low AC voltage is present at the input to the power supply.

A high impedance short correction circuit 120, 125, 130 according to the present invention for this regulated switched power supply is shown coupled to the regulated current output. The circuit receives an input from a sampling circuit 120 including a sampling resistor R30 and comprises a level adjuster 125, a differential amplifier circuit 130 acting as a monitor voltage generator and a buffer circuit 135. Sampling circuit 120, which may be a simple resistor R30, samples the output and provides the same to a level adjuster 125. The level adjustor 125 preferably comprises a plurality of diode connected transistors such as four MPQ2483 transistors with 10 kohm biasing resistors shown. The level adjustor 125 offsets the error voltage generated in the sampling resistor R30 to differential amplifier 130. Without the level adjustor 125, the inputs from R30 and the supply voltage to amplifier 130 may be so close in value that the amplifier 130 will not operate. In the alternative, PNP transistors could be used in place of the NPN transistors shown. Also, a diode array or even discrete diodes could be used so long as they are batch matched. Transistors and diodes from the same silicon dies will have similar turn-on voltage and drift over temperature (important in the temperature varying environment of the present power supply).

As can be seen from the schematics of FIGS. 1A–1D, the voltage level on each side of the sensing resistor R30 is provided via the level adjustor 125 to the inputs of the differential amplifier 130. These inputs are differentially amplified and provide a monitor output voltage to buffer circuit 135. The differential amplifier 130 preferably comprises a low offset, low drift operational amplifier for accuracy over temperature. Buffer 135 provides the over current control input to the RT/CT pin of controller 105 and so causes controller circuit 105 to interrupt its operation. Zener diode CR14 of buffer 135 is preferably temperature compensated and may be a type 1N821 for accuracy over temperature. When controller 105 operation is interrupted, it recovers automatically at a 900 Hz rate in the present application shown.

Thus there has been shown and described a switched regulated power supply including a high impedance short protection circuit according to the present invention. Any US patents referred to herein should be deemed to be incorporated by reference as to any subject matter deemed to be essential to an understanding of the present invention. The present invention should only be deemed to be limited by the scope of the claims which follow.

What I claim is:

1. A regulated power supply comprising a filter, voltage doubler and current sensing transformer, the power supply regulated by a controller, the improvement comprising:

a sampling circuit for sensing an output over current condition via a monitored voltage drop, wherein the sampling circuit comprises a resistor having first and second terminals;

a level adjusting circuit coupled to the sampling circuit for adjusting the level of the monitored voltage drop, the level adjusting circuit comprising a first input coupled to the first terminal of the resistor of the sampling circuit; a second input coupled to the second terminal of the resistor of the sampling circuit; a first processing circuit coupled to the first input for generating a first output; the first processing circuit comprises first and second diode connected transistors; and a second processing circuit coupled to the second input for generating a second output;

a differential amplifier, coupled to outputs of the level adjusting circuit, for providing a monitor output voltage, wherein the differential amplifier comprises a first input coupled to the first output of the level adjusting circuit, a second input coupled to the second output of the level adjusting circuit; and an output for providing the monitor output voltage; and a buffer circuit connected to the output of the differential amplifier for interrupting controller operation to thereby interrupt current flow at an output of the regulated power supply.

2. The regulated power supply of claim 1, wherein the first and second diode connected transistors have similar turn-on voltages and drifts over temperature.

3. The regulated power supply of claim 2, wherein the first and second diode connected transistors are manufactured from the same silicon die.

4. The regulated power supply of claim 1, wherein the second processing circuit comprises:

third and fourth diode connected transistors.

5. The regulated power supply of claim 4, wherein the third and fourth diode connected transistors have similar turn-on voltages and drifts over temperature.

6. The regulated power supply of claim 5, wherein the third and fourth diode connected transistors are manufactured from the same silicon die.

* * * * *